(12) United States Patent
Wen et al.

(10) Patent No.: US 12,316,724 B2
(45) Date of Patent: May 27, 2025

(54) SEGMENT ROUTING HEADER COMPRESSION METHOD AND APPARATUS, SERVICE PROCESSING METHOD AND APPARATUS, COMPUTER DEVICE AND COMPUTER-READABLE MEDIUM

(71) Applicant: ZTE CORPORATION, Guangdong (CN)

(72) Inventors: Jianzhong Wen, Guangdong (CN); Aihua Liu, Guangdong (CN); Ran Chen, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 343 days.

(21) Appl. No.: 17/917,580

(22) PCT Filed: Apr. 6, 2021

(86) PCT No.: PCT/CN2021/085734
§ 371 (c)(1),
(2) Date: Oct. 7, 2022

(87) PCT Pub. No.: WO2021/204129
PCT Pub. Date: Oct. 14, 2021

(65) Prior Publication Data
US 2023/0145372 A1 May 11, 2023

(30) Foreign Application Priority Data
Apr. 7, 2020 (CN) .......................... 202010266043.X (51) Int. Cl.
*H04L 45/24* (2022.01)
*H04L 45/00* (2022.01)
*H04L 69/22* (2022.01)

(52) U.S. Cl.
CPC .............. *H04L 69/22* (2013.01); *H04L 45/34* (2013.01)

(58) Field of Classification Search
CPC ......... H04L 69/22; H04L 45/34; H04L 45/74; H04L 69/04; H04L 45/50; H04L 2101/659
See application file for complete search history.

(56) References Cited

U.S. PATENT DOCUMENTS

2014/0269422 A1 * 9/2014 Filsfils .................. H04L 47/724
370/254
2014/0369356 A1 12/2014 Bryant
(Continued)

FOREIGN PATENT DOCUMENTS

CN 108429685 A 8/2018
CN 109688057 A 4/2019
(Continued)

OTHER PUBLICATIONS

Li C Li Huawei Technologies C Xie China Telecom: Compressed SRv6 network programming; draft-li-spring-compressed-srv6-np-02. txt, Compressed SRV6 Network Programming; DRAFT-LI-SPRING-COMPRESSED-SRV6-NP-02. TXT; Internet Society (ISO, No. 2, Feb. 25, 2020, pp. 1-24, XP015137894 (Year: 2020).*
(Continued)

*Primary Examiner* — Lan-Huong Truong
(74) *Attorney, Agent, or Firm* — Li & Cai Intellectual Property (USA) Office (57) ABSTRACT

An embodiment of the present disclosure relates to segment routing header compression method and apparatus, service processing method and apparatus, computer device and computer-readable medium. The segment routing header compression method includes: configuring a regular compression segment identification for respective nodes on a segment routing path and configuring an extended compres-
(Continued)

sion segment identification for at least one of nodes on the segment routing path; generating a segment list which includes the regular compression segment identification of the respective nodes and the extended compression segment identification of the at least one of the nodes, in the segment list, the extended compression segment identification of the at least one of the nodes being adjacent to and located after the regular compression segment identification of the at least one of the nodes; and carrying the segment list in a segment routing header of a service message.

15 Claims, 8 Drawing Sheets

(56) References Cited

U.S. PATENT DOCUMENTS

2019/0260657 A1     8/2019  Clarence
2020/0195556 A1*    6/2020  Tang ................... H04L 45/741

FOREIGN PATENT DOCUMENTS

| CN | 110266594 A | 9/2019 | |
|---|---|---|---|
| CN | 110557329 A | 12/2019 | |
| EP | 4020909 A1 * | 6/2022 | ............. H04L 45/02 |

OTHER PUBLICATIONS

China Patent Office, First Office Action issued Jul. 19, 2023 for application No. CN202010266043.X.
European Patent Office, The extended European search report issued Sep. 14, 2023 for application No. EP21785071.8.
Yao Liu et al. : "BGP-LS extensions for shorter SRv6 SID draft-liu-idr-bgp-Is-shorter-srv6-extensions-00", ZTE Corporation, IETF, Mar. 28, 2020.
Li C Li Huawei Technologies C Xie K Lee LG U+ Tian F Zhao Caict J Guichard C Li China Telec: "Compressed SRv6 network programming; draft-li-spring-compressed-srv6-np-02. txt", Compressed SRV6 Network Programming; Draft-Li-Spring-Compressed-SRV6-NP-02. TXT; Internet Draft: Spring Working Group, Internet Engineering Task Force, IETF; Standardworkingdraft, Internet Society (ISO, No. 2, Feb. 25, 2020, pp. 1-24, XP015137894.
Cheng W Et Al: "Compressed SRv6 segment list encoding in SRH; draft-filsfilscheng-spring-srv6-srh-comp-sl-enc-01. txt", Compressed SRV6 Segment List Encoding in SRH; DRAFT-FILSFILSCHENG-SPRING-SRV6-SRH-COMP-SL-ENC-01. Txt; Internet Draft: Spring, Internet Engineering Task Force, IETF; Standardworkingdraft, Internet Soci, No. 1, May 19, 2020, pp. 1-12, XP015139646.
Chongfeng Xie et al.: "Research and practice of SRv6 for integrated carrying of video cloud", Telecommunications Science, 2019, 35(12), Jan. 8, 2020.
WIPO, International Search Report issued on Jun. 25, 2021.

* cited by examiner

| IPv6 Hdr | SA = 2001::A:0, DA= 2001::B:0 |
|---|---|
| SR Hdr<br>SL=5 | D:0 |
| | FA:88 |
| | F:F0 |
| | E:0 |
| | B:0 |

SEGMENT ROUTING HEADER COMPRESSION METHOD AND APPARATUS, SERVICE PROCESSING METHOD AND APPARATUS, COMPUTER DEVICE AND COMPUTER-READABLE MEDIUM

FIELD OF THE INVENTION

The present disclosure relates to the technical field of wireless communication.

BACKGROUND OF THE INVENTION

Segment routing (SR) is a technology for realizing source routing. RFC8402 defines two standard SR mechanisms, i.e., an SR-MPLS based on an MPLS (multi-protocol label switching) forwarding plane and an SRv6 based on an IPv6 (internet protocol version 6) forwarding plane. With the exhaustion of the addresses of an IPv4 (internet protocol version 4) and the rapid development of the internet of things, the IPv6 has been deployed in more and more networks. The SRv6 may be realized by directly extending a routing header based on the IPv6 without adding additional packaging, which achieves the unification of IP (internet protocol) forwarding and tunnel forwarding. Meanwhile, since the SRv6 adopts a segment ID (SID) in a 128-bit format with a same IPv6 address and the segment ID is divided into two portions, i.e., a locator portion and a function portion, flexible network and service hybrid programming can be achieved. Therefore, the SRv6 has been widely recognized in the industry.

SUMMARY OF THE INVENTION

According to an aspect of embodiments of the present disclosure, a segment routing header (SRH) compression method is provided. The segment routing header compression method includes: configuring a regular compression segment identification (C-SID) for respective nodes on a segment routing path and configuring an extended compression segment identification (E-C-SID) for at least one of nodes on the segment routing path, the E-C-SID of the at least one of the nodes including at least a function field; generating a segment list which includes the C-SID of the respective nodes and the E-C-SID of the at least one of the nodes, in the segment list, the E-C-SID of the at least one of the nodes being adjacent to and located after the C-SID of the at least one of the nodes; and carrying the segment list in an SRH of a service message.

According to another aspect of embodiments of the present disclosure, a service processing method is further provided, which is applied to a node on a segment routing path. The service processing method includes: acquiring a segment list from an SRH of a received service message, the segment list including a C-SID configured for respective nodes on the segment routing path and an E-C-SID configured for at least one of the nodes on the segment routing path, the E-C-SID configured for the at least one of the nodes being adjacent to and located after the C-SID configured for the at least one of the node; and acquiring, in response to determining that a current compression segment identification to be processed in the segment list is the E-C-SID, content of a function field of the E-C-SID, and performing an operation defined by the content.

According to another aspect of embodiments of the present disclosure, a segment routing header compression apparatus is further provided. The segment routing header compression apparatus includes a configuring module, a generating module, and a processing module. The configuring module is configured to configure a C-SID for respective nodes on a segment routing path, and to configure an E-C-SID for at least one of node on the segment routing path, the E-C-SID of the at least one of the nodes including at least a function field; the generating module is configured to generate a segment list which includes the C-SID of the respective nodes and the E-C-SID of the at least one of the nodes, in the segment list, the E-C-SID of the at least one of the nodes being adjacent to and located after the C-SID of the at least one of the nodes; and the processing module is configured to carry the segment list in an SRH of a service message.

According to another aspect of embodiments of the present disclosure, a service processing apparatus is further provided, which is applied to a node on a segment routing path. The service processing apparatus includes an acquiring module and a processing module. The acquiring module is configured to acquire a segment list from an SRH of a received service message, the segment list including a C-SID configured for respective nodes on the segment routing path and an E-C-SID configured for at least one of nodes on the segment routing path, the E-C-SID configured for the at least one of the nodes being adjacent to and located after the C-SID configured for the at least one of the nodes; and the processing module is configured to acquire, in response to determining that a current compression segment identification to be processed in the segment list is the E-C-SID, content of a function field of the E-C-SID, and to perform an operation defined by the content.

According to another aspect of embodiments of the present disclosure, a computer device is provided. The computer device includes: one or more processors; and a storage apparatus storing one or more programs thereon. The one or more programs, when executed by the one or more processors, causes the one or more processors to implement the above segment routing header compression method or the above service processing method.

According to another aspect of embodiments of the present disclosure, a computer readable medium is provided. The computer readable medium stores a computer program. The computer program, when executed, implements the above segment routing header compression method or the above service processing method.

BRIEF DESCRIPTION OF THE DRAWINGS

FIG. 6b is a schematic diagram of a destination address (DA) in an IPv6 message header in FIG. 6a.

FIG. 7b is a schematic diagram showing adopting an SRH of a single E-C-SID in FIG. 7a.

FIG. 7c is a schematic diagram showing adopting an SRH of a combined E-C-SID in FIG. 7a.

DETAILED DESCRIPTION OF THE EMBODIMENTS

Exemplary embodiments will be described more fully with reference to the drawings hereinafter, but the exemplary embodiments may be embodied in different forms and should not be interpreted as being limited to the embodiments set forth herein. On the contrary, these embodiments are provided for the purpose of making the present disclosure thorough and complete and enabling the scope of the present disclosure better understood by those skilled in the art.

As used herein, the term "and/or" includes any or all combinations of one or more relevant listed items.

Terms used herein are only used for describing specific embodiments, and are not intended to limit the present disclosure. As used herein, the singular forms, "a" and "the", are also intended to include the plural form, unless otherwise indicated expressly in the context. It should also be understood that, when the terms, such as "include" and/or "made of", are used in the description, it is specified that the feature, entity, step, operation, element and/or component are/is present, without excluding a case where one or more other features, entities, steps, operations, elements, components and/or groups thereof are present or added.

The embodiments herein may be described by means of ideal schematic diagrams and with reference to plan views and/or sectional views. Therefore, exemplary illustrations may be modified according to manufacturing technologies and/or tolerances. Thus, the embodiments are not limited to embodiments shown in the drawings, but include modifications of the configurations made based on the manufacturing technologies. Therefore, an area illustrated in the drawings is schematic. Moreover, a shape of the area shown in the drawings exemplifies a specific shape of the area of an element, but is not intended to be restrictive.

Unless otherwise defined, all terms (including technological and scientific terms) used herein have the same meanings as those generally understood by those of ordinary skills in the art. It should also be understood that, those terms defined in common dictionaries shall be interpreted as having a meaning that is consistent with a meaning in relevant technologies and in the context of the present disclosure, and shall not be interpreted in an idealized or excessive sense, unless the terms are expressly defined in such a manner herein.

In an SRv6 solution, a service path is described by using a segment list including a series of 128-bit segment identifications, and thus an overhead of a message header is too high. In order to solve this problem, many solutions for segment routing header compression are proposed in the industry, such as a uSID solution (draft-filsfils-spring-net-pgm-extension-srv6-usid-02). A 16-bit common prefix and a 16-bit compression identification are adopted in the uSID solution. However, the segment routing header compression is only discussed in this solution, and how to realize a network programing function is not described. If the network programing function is to be realized, 16 bits are required to both represent a locator and to realize the function, and a length of the 16 bits is not sufficient. If the length is increased to 32 bits, a certain programing capability may be obtained (for example, by dividing the 32 bits to a portion of 20 bits for representing the locator and to a portion of 12 bits for realizing the function), but the programing capability thereof is still weak and the compression efficiency is reduced. Another solution for segment routing header compression is a solution of regular compression segment identification (C-SID) (draft-li-spring-compressed-srv6-np-00), and the programmable capability thereof is provided at a tail node of a forwarding path only and cannot be provided at an intermediate node even though it may provide a flexible programmable capability while realizing the segment routing header compression.

Figure 1:
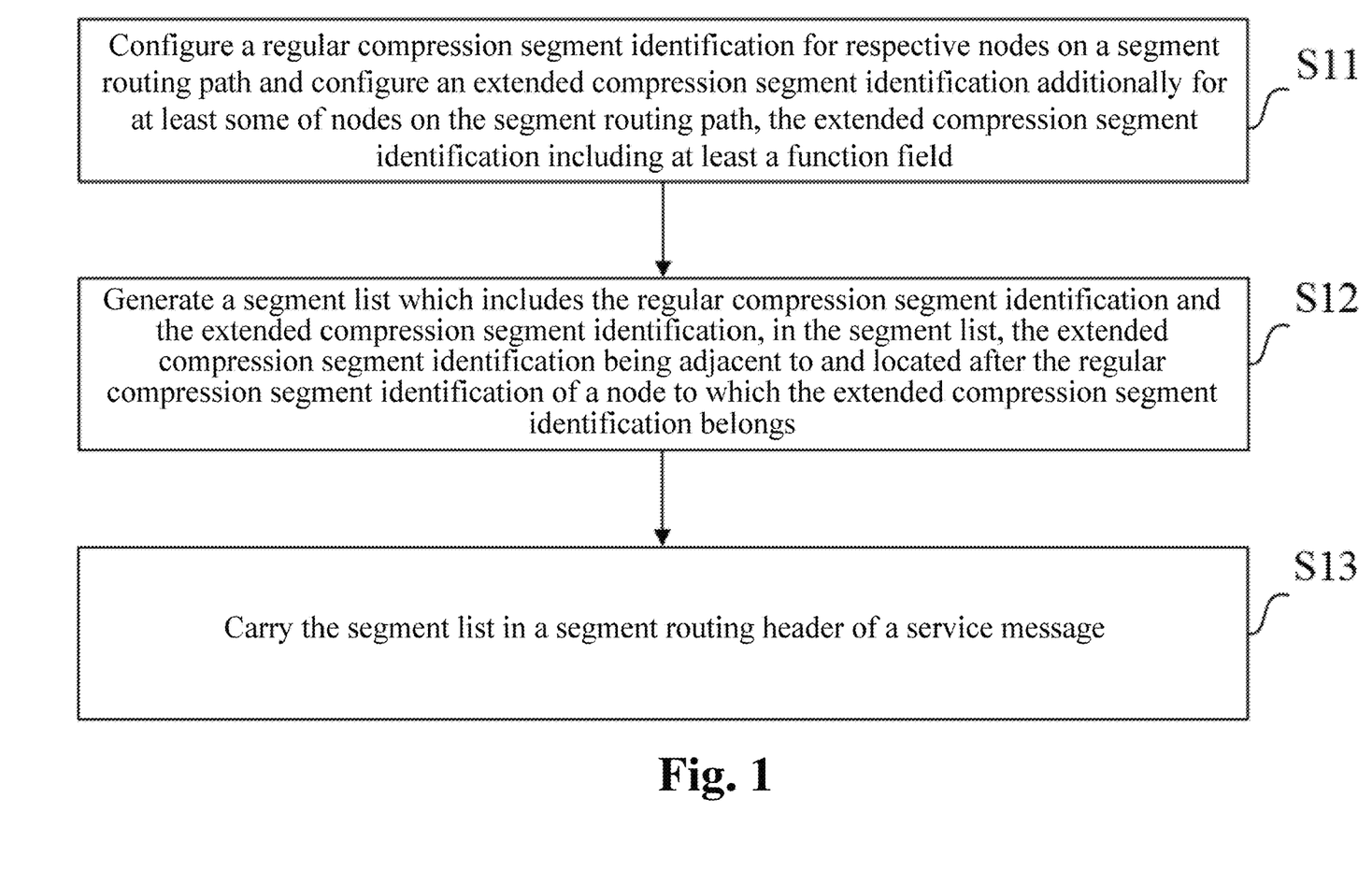
FIG. 1 is a schematic flowchart of a segment routing header compression method provided according to an embodiment of the present disclosure.

In view of the above disadvantages existing in the related art, an embodiment of the present disclosure provides a segment routing header compression method. FIG. 1 schematically shows a flowchart of a segment routing header compression method provided according to an embodiment of the present disclosure. The segment routing header compression method may include step 11 to step 13.

At step 11, a C-SID is configured for respective nodes on a segment routing path, and an E-C-SID is additionally configured for at least some of nodes on the segment routing path, the E-C-SID including at least a function field.

At this step, the C-SID is configured for each of the nodes on the segment routing path by a segment routing header compression apparatus, and the E-C-SID is configured for some of the nodes on the segment routing path by the segment routing header compression apparatus. In other words, on the segment routing path, some of the nodes are configured with the C-SID only, and some of the nodes are configured with both the C-SID and the E-C-SID. At this step, after the segment routing header compression apparatus configures the C-SID and the E-C-SID for a corresponding node, respective nodes may diffuse the C-SID to an entire SR domain though an IGP (interior gateway protocol), and may diffuse the E-C-SID through the IGP or save the E-C-SID locally only. In some embodiments, a global routing table may be used by the respective nodes to store the C-SID thereof; and a local segment identification table may be used by the nodes configured with the E-C-SID to store an extended compression segment routing identification thereof.

Figure 2A:
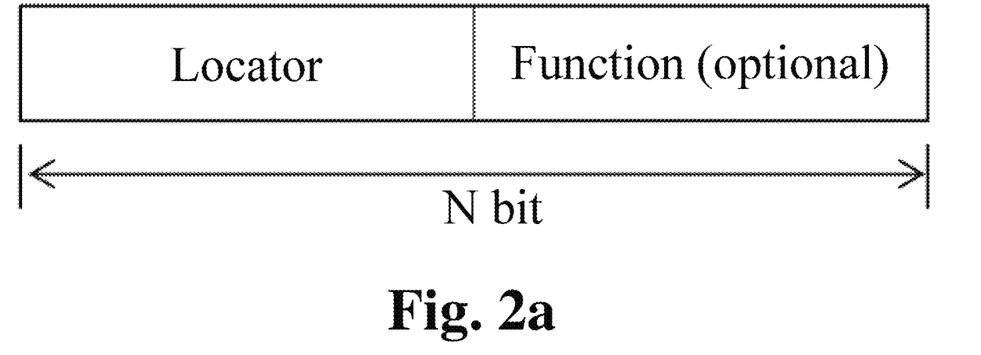
FIG. 2a is a schematic diagram of a C-SID provided according to an embodiment of the present disclosure.
Figure 2B:
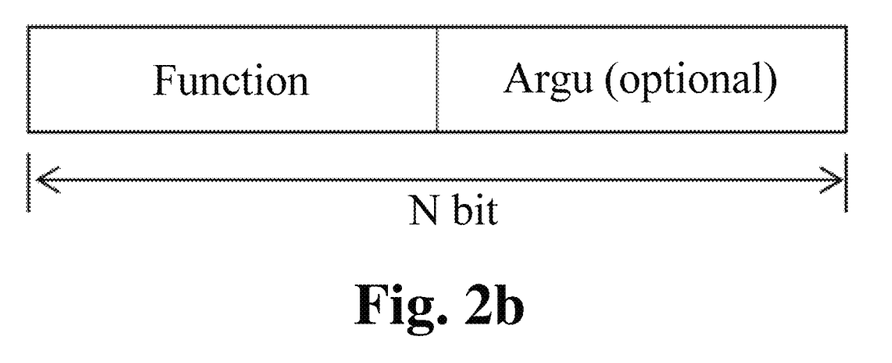
FIG. 2b is a schematic diagram of a single E-C-SID provided according to an embodiment of the present disclosure.
Figure 2C:
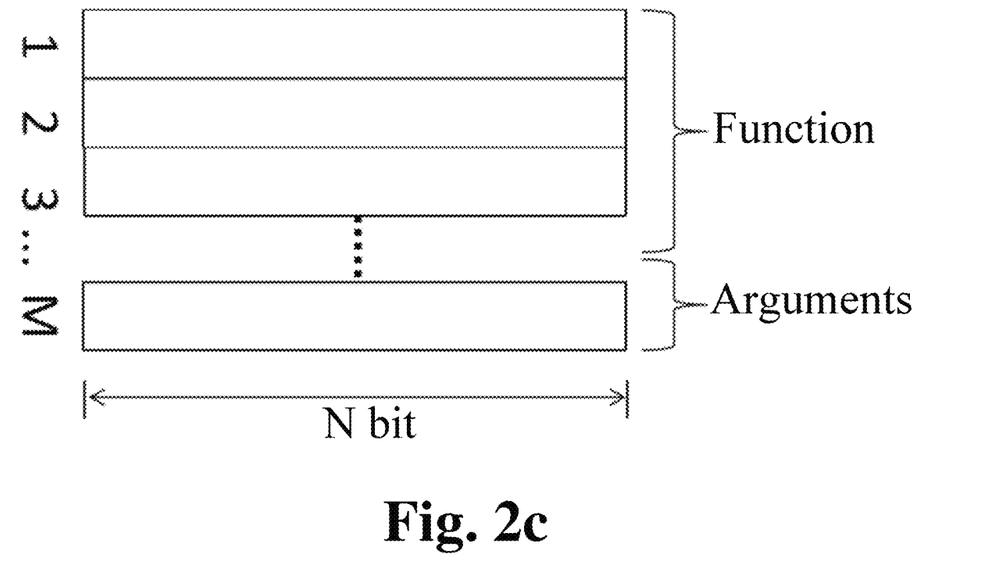
FIG. 2c is a schematic diagram of a combined E-C-SID provided according to an embodiment of the present disclosure.

FIG. 2a is a schematic diagram of a C-SID provided according to an embodiment of the present disclosure. A regular compression segment identification (C-SID) includes a locator filed and a function field. As shown in FIG. 2b and FIG. 2c, FIG. 2b is a schematic diagram of a single E-C-SID provided according to an embodiment of the present disclosure, and FIG. 2c is schematic diagram of a combined E-C-SID provided according to an embodiment of the present disclosure. An extended compression segment identification (E-C-SID) includes at least a function field. The function field of the E-C-SID may support a service processing function, such as an end type defined by an IANA (the internet assigned numbers authority).

In some embodiments, a length of the C-SID and a length of the E-C-SID as well as bytes occupied by respective fields may be set according to different application scenes, and details will be described in the following in conjunction with specific application scenes.

At step 12, a segment list which includes the C-SID and the E-C-SID is generated, and in the segment list, the E-C-SID is adjacent to and located after the C-SID of a node to which the E-C-SID belongs.

At this step, a source node of the segment routing path performs a calculation to generate the segment list. The segment list adopts a format of a compression segment identification; and the C-SID, or the C-SID and E-C-SID, of each node are compressed into the segment list according to network programming requirements. In the segment list, compression segment identifications of respective nodes on the segment routing path are arranged according to a forwarding sequence of a service message, and the C-SID of a node is located before the E-C-SID of the same node.

At step 13, the segment list is carried in an SRH of a service message.

At this step, the segment list is carried in the SRH of the service message, and the segment list includes the C-SID and the E-C-SID. In this way, when the service message is forwarded, transmission of information in the C-SID and in the E-C-SID between the respective nodes on the segment routing path may be realized, so as to greatly reduce the overhead of the SRv6.

According to the segment routing header compression method provided in the embodiment of the present disclosure, the C-SID is configured for each node on the segment routing path, and the E-C-SID is additionally configured for at least some of nodes on the segment routing path, the E-C-SID including at least a function field; the segment list which includes the C-SID and the E-C-SID is generated, and in the segment list, the E-C-SID is adjacent to and located after the C-SID of the node to which the E-C-SID belongs; and the segment list is carried in the SRH of the service message. According to the embodiments provided in the present disclosure, by adopting the E-C-SID including the function field, the network programming capability of the node can be enhanced while maintaining a segment identification compression characteristic, so that extension of a service function of the node can be realized; and an extended compression identification may not only be deployed at the tail node of the segment routing path but also be deployed at the intermediate node, so that the wide applicability and the flexibility of service processing can be improved. In the embodiment of the present disclosure, the flexible network programming capability is maintained while the overhead of the SRv6 is greatly reduced, which helps to rapidly advance the implementation and deployment of the SRv6 in an existing network.

In some embodiments, as shown in FIG. 2b and FIG. 2c, the E-C-SID may further include an argument field. The argument field is an optional field, and may be used to carry a self-defined argument, so as to realize a relatively complex function, for example, a function related to a service function chain (SFC). The E-C-SID may not only use the function field to realize simple service processing (such as the end type defined by the IANA) but also may use the argument field to realize a relatively complex service function.

In some embodiments, the E-C-SID may include the single E-C-SID or the combined E-C-SID. As shown in FIG. 2b, the single E-C-SID includes one function field. As shown in FIG. 2c, the combined E-C-SID includes multiple function fields, and respective function fields are respectively used to realize different portions of the same function. In other words, one complete function may be realized after all function fields of one combined E-C-SID are combined.

In an embodiment of the present disclosure, the compression segment identification includes two types, i.e., the C-SID and an extended segment identification (i.e., the extended compression segment identification (E-C-SID)). The C-SID may be distinguished from the E-C-SID by two manners, i.e., by defining a flag field, or by defining a newly added function.

Distinguishing the C-SID from the E-C-SID by defining the flag field may include the following manners (1) and (2).

Figure 3A:
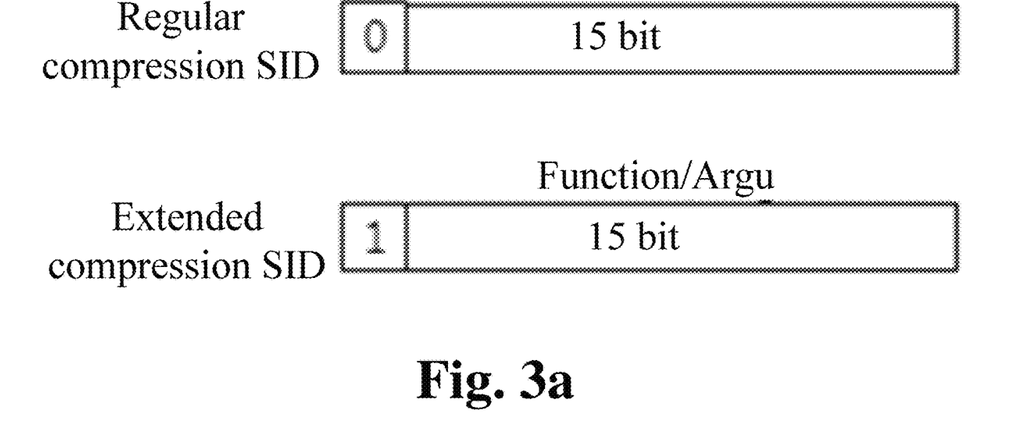
FIG. 3a is a schematic diagram of an example of a C-SID and an E-C-SID provided according to an embodiment of the present disclosure.

(1) Each of the C-SID and the E-C-SID includes a first flag field for indicating the C-SID or the E-C-SID. As shown in FIG. 3a, FIG. 3a is a schematic diagram of an example of the C-SID and the E-C-SID provided according to an embodiment of the present disclosure. The length of the C-SID and the length of the E-C-SID each may be 16 bits. The C-SID differs from the E-C-SID only in that a value of a first bit of the compression segment identification of the C-SID is different with that of the E-C-SID. The compression segment identification indicates the C-SID when the first bit is 0, and the compression segment identification indicates the E-C-SID when the first bit is 1.

(2) The SRH of the service message includes a second flag field for indicating that each of compression segment identifications in the segment list is the C-SID or the E-C-SID. In other words, a preset bit of the SRH of the service message is used as the second flag field for indicating whether a corresponding compression segment identification is the C-SID or the E-C-SID.

Distinguishing the C-SID from the E-C-SID by defining the newly added function may include that the C-SID of the node which has been configured with the E-C-SID includes a function field, which is used to define the process for the E-C-SID of the node to which the C-SID belongs. In other words, for the node (for example, a node X) which has been configured with the E-C-SID, as shown in FIG. 2a, the C-SID of the node includes the function field which is used to define the process for the E-C-SID (the compression segment identification next to the C-SID of the node X in the segment list) of the node (e.g., the node X) to which the C-SID belongs, and the E-C-SID may be the single E-C-SID shown in FIG. 2b and may alternatively be the combined E-C-SID shown in FIG. 2c.

In the embodiment of the present disclosure, the E-C-SID may include two types, i.e., the single E-C-SID and the combined E-C-SID. Distinguishing the single E-C-SID from the combined E-C-SID may be realized by two manners, i.e., by defining a length field or by defining a flag field.

Distinguishing the single E-C-SID from the combined E-C-SID by defining the length field includes the following manners (1) and (2).

(1) The C-SID includes a first length field for indicating a length of the E-C-SID of the node to which the C-SID belongs, and the length of the E-C-SID is a multiple of a length of the single E-C-SID. In other words, for the node (for example, the node X) configured with the E-C-SID, the first length field included in the C-SID defines the type of the E-C-SID of the node (i.e., the node X). If a value of the first length field is 1, it indicates that the E-C-SID of the node X is the single E-C-SID; and if the value of the first length field is greater than or equal to 2, it indicates that the E-C-SID of the node X is the combined E-C-SID.

Figure 3B:
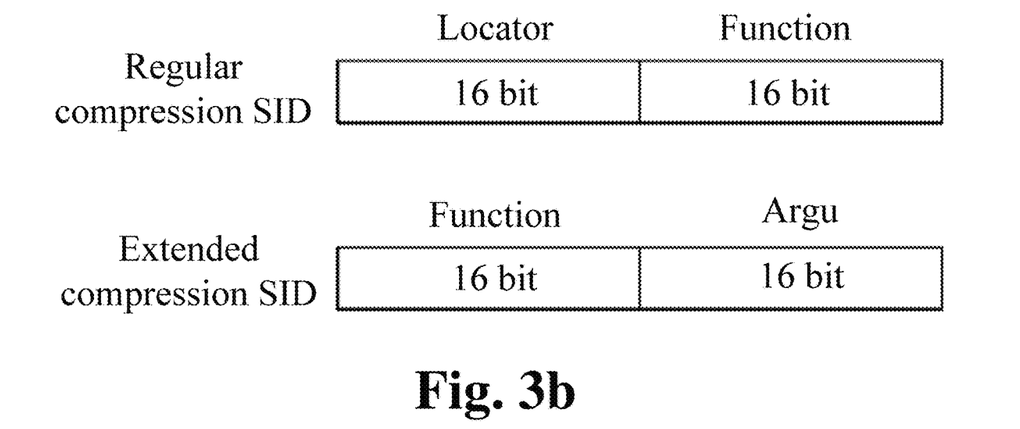
FIG. 3b is a schematic diagram of an example of a C-SID and an E-C-SID provided according to an embodiment of the present disclosure.
Figure 3C:
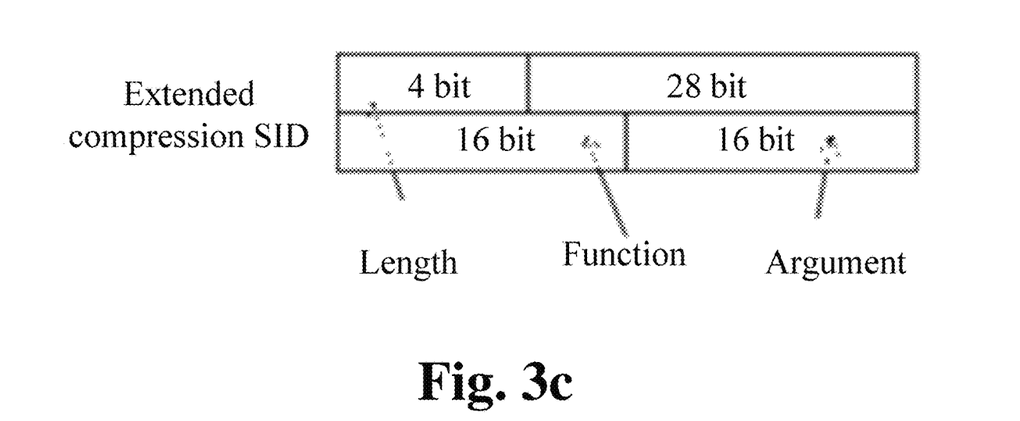
FIG. 3c is a schematic diagram of an example of a combined E-C-SID provided according to an embodiment of the present disclosure.

(2) The E-C-SID includes a second length field for indicating a length of the E-C-SID, and the length of the E-C-SID is a multiple of a length of the single E-C-SID. As shown in FIG. 3c, FIG. 3c is a schematic diagram of an example of the combined E-C-SID provided according to the embodiment of the present disclosure. If the length of the single E-C-SID is 32 bits, the E-C-SID includes a 4-bit second length field. The length of the E-C-SID shown in FIG. 3c is 64 bits, which is twice the length of the single E-C-SID (32 bits). Thus, in the E-C-SID, a value of the second length field is 2, the length of the function field is 44 bits, and the remaining bits indicate the argument field.

Distinguishing the single E-C-SID from the combined E-C-SID by defining the flag field includes that, the E-C-SID includes a third flag field for indicating whether the E-C-SID is the final E-C-SID of the node to which the E-C-SID belongs. In other words, whether an extended compression field (i.e., the extended compression segment identification) is the single E-C-SID or the combined E-C-SID is determined based on a value of the third flag field included in the E-C-SID. If the value of the third flag field indicates that the E-C-SID is the final E-C-SID of the node to which the E-C-SID belongs, the E-C-SID is the single E-C-SID; and if the value of the third flag field indicates that the E-C-SID is not the final E-C-SID of the node to which the E-C-SID belongs, the E-C-SID is the combined E-C-SID.

Figure 4:
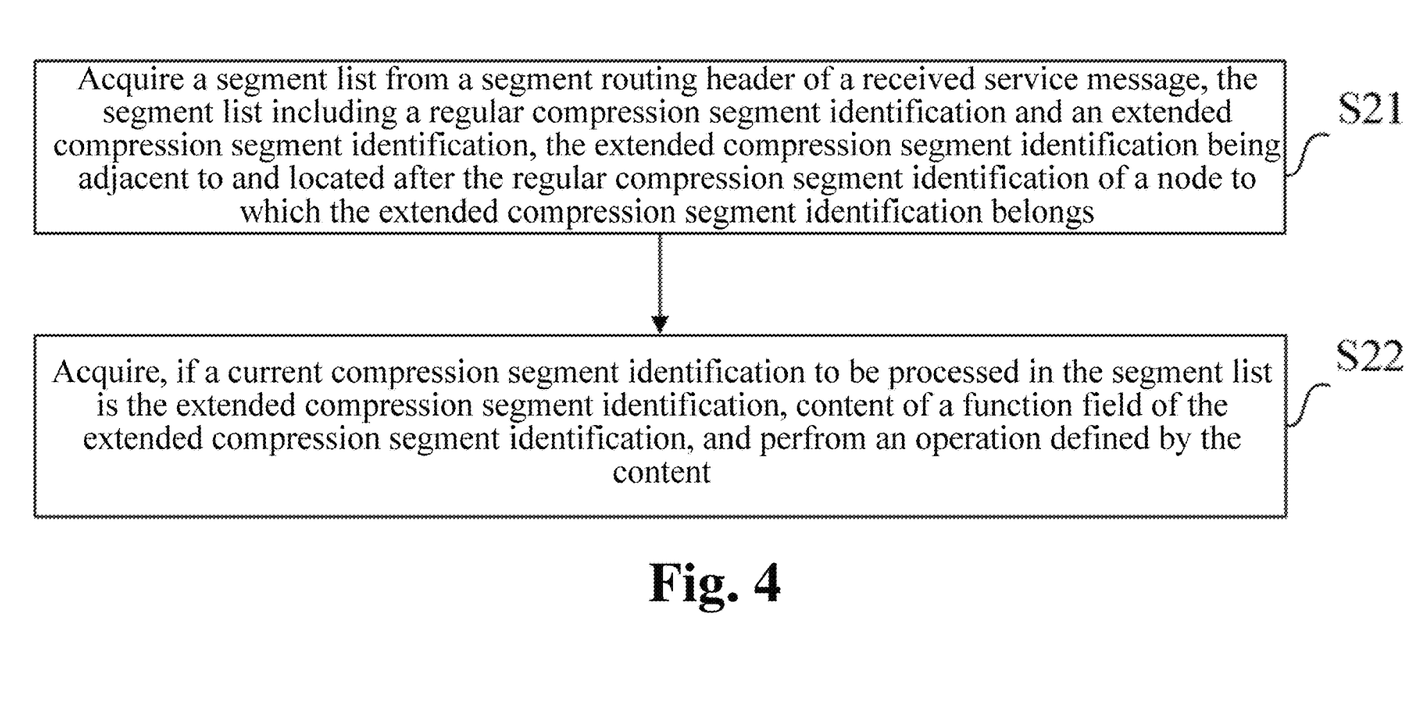
FIG. 4 is a schematic flowchart of a service processing method provided according to an embodiment of the present disclosure.

An embodiment of the present disclosure further provides a service processing method, which may be applied to a node on a segment routing path. Each node on the segment routing path is configured with a C-SID, and at least some of nodes on the segment routing path are additionally configured with an E-C-SID, the E-C-SID including at least a function field. As shown in FIG. 4, FIG. 4 is a schematic flowchart of a service processing method provided according to the embodiment of the present disclosure. The service processing method may include step 21 to step 22.

At step 21, a segment list is acquired from an SRH of a received service message. The segment list includes a C-SID and an E-C-SID, and the E-C-SID is adjacent to and located after the C-SID of a node to which the E-C-SID belongs.

At this step, after the node on the segment routing path receives the service message sent from a previous-hop node, the segment list is acquired from the SRH of the service message. The SRH of the service message is compressed by using the segment routing header compression method provided in the preceding embodiment. In other words, before the service message is forwarded, the segment list including the C-SID and the E-C-SID is generated by the segment routing header compression apparatus, so as to realize compression of the SRH.

In step 22, if a current compression segment identification to be processed in the segment list is the E-C-SID, the content of a function field of the E-C-SID is acquired, and an operation defined by the content is performed.

At this step, a service processing apparatus determines, based on the segment list, whether the current compression segment identification to be processed is the E-C-SID. If the current compression segment identification to be processed is the E-C-SID, the content of the function field of the E-C-SID to be processed is acquired, and the operation defined by the content is performed, so as to realize a network programming function of the node. If the current compression segment identification to be processed is the C-SID, the processing is performed according to an existing flow. For example, if the C-SID includes a function field, content of the function field of the C-SID is acquired, and the operation defined by the content is performed.

According to the service processing method provided in the embodiment of the present disclosure, the segment list is acquired from the SRH of the received service message. The segment list includes the C-SID and the E-C-SID, and the E-C-SID is adjacent to and located after the C-SID of the node to which the E-C-SID belongs. If the current compression segment identification to be processed in the segment list is the E-C-SID, the content of the function field of the E-C-SID is acquired, and the operation defined by the content is performed. According to the embodiment provided in the present disclosure, by using the E-C-SID including the function field, the network programming capability of the node can be improved while maintaining a segment identification compression characteristic, so that extension of a service function of the node can be realized. An extended compression identification may not only be deployed at the tail node of the segment routing path but also be deployed at the intermediate node, so that the wide applicability and the flexibility of service processing can be improved. In the embodiment of the present disclosure, the flexible network programming capability is maintained while the overhead of the SRv6 is greatly reduced, which helps to rapidly advance the implementation and deployment of the SRv6 in an existing network.

In some embodiments, if one of the following conditions, i.e., a to c, is met, it is considered that the current compression segment identification to be processed is the E-C-SID.

Condition a: a value of a preset first flag field in the current compression segment identification to be processed is a flag for indicating the E-C-SID. As shown in FIG. 3a, a first bit of the compression segment identification is the first flag field. The value of the first flag field being 0 indicates that the compression segment identification is the C-SID, and the value of the first flag field being 1 indicates that the compression segment identification is the E-C-SID.

Condition b: a value of a preset second flag field in an SRH of a service message is a flag for indicating that the current compression segment identification to be processed is the E-C-SID.

Condition c: a function field of a previous processed C-SID in the segment list has defined the process for the E-C-SID of the node to which the C-SID belongs. As shown in FIG. 2a, if the function field of the previous processed C-SID in the segment list has defined the process for the E-C-SID of the node to which the C-SID belongs, it indicates that the node has been configured with an extended compression identification (i.e., the extended compression segment identification (E-C-SID)). Correspondingly, a compression segment identification (i.e., the current compression segment identification to be processed) next to the C-SID in the segment list is the E-C-SID.

As described before, the E-C-SID includes a single E-C-SID and a combined E-C-SID. The single E-C-SID includes one function field. The combined E-C-SID includes multiple function fields, and respective function fields are used to realize different portions of the same function, respectively.

Figure 5:
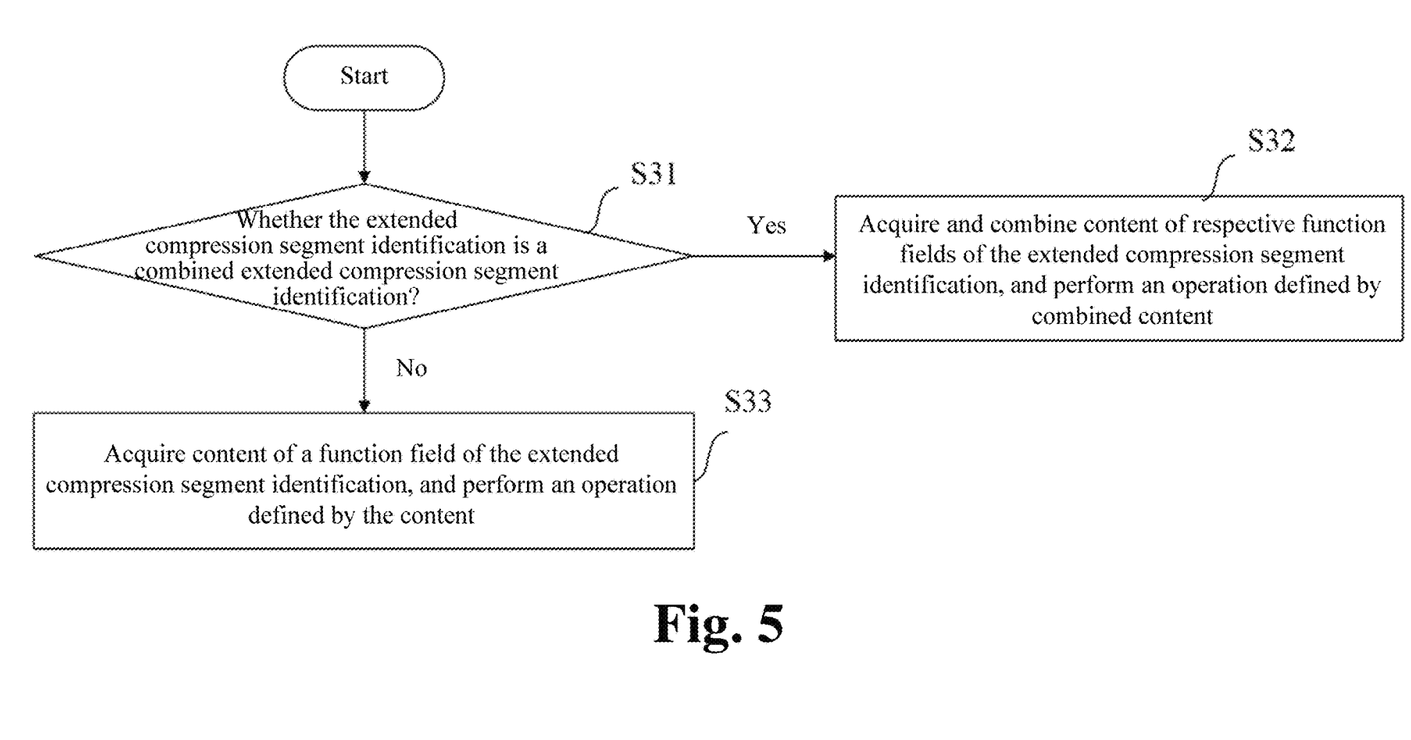
FIG. 5 is a schematic flowchart of a service processing method provided according to an embodiment of the present disclosure.

In some embodiments, as shown in FIG. 5, FIG. 5 is a schematic flowchart of a service processing method provided according to an embodiment of the present disclosure. Acquiring the content of the function field of the E-C-SID and performing the operation defined by the content (i.e., step 22) may include step 31 to step 33.

At step 31, determination of whether the E-C-SID is the combined E-C-SID is performed. If the E-C-SID is the combined E-C-SID, step 32 is performed; and if the E-C-SID is not the combined E-C-SID, step 33 is performed.

In some embodiments, if one of the following conditions, i.e., d to f, is met, it is considered that the E-C-SID is the combined E-C-SID.

Condition d: a value of a preset first length field in the C-SID of a node to which the E-C-SID belongs is greater than or equal to 2. The first length field is used for indicating a length of the E-C-SID of the node to which the E-C-SID belongs, and the length is a multiple of a length of the single E-C-SID.

Condition e: a value of a preset second length field in the E-C-SID is greater than or equal to 2. The second length field is used for indicating a length of the E-C-SID, and the length is a multiple of the length of the single E-C-SID. For example, if the length of the single E-C-SID is 32 bits, the E-C-SID includes a 4-bit second length field. The current compression segment identification to be processed in the segment list is the E-C-SID shown in FIG. 3c, and has a length of 64 bits, which is twice the length (32 bits) of the single E-C-SID. Therefore, the value of the second length field is 2. Therefore, the E-C-SID is the combined E-C-SID.

Condition f: a value of a preset third flag field in the E-C-SID indicates that the E-C-SID is not a final E-C-SID of the node to which the E-C-SID belongs. In other words, if the value of the third flag field indicates that the E-C-SID is the final E-C-SID of the node to which the E-C-SID belongs, the E-C-SID is the single E-C-SID; and if the value of the third flag field indicates that the E-C-SID is not the final E-C-SID of the node to which the E-C-SID belongs, the E-C-SID is the combined E-C-SID.

At step 32, content of respective function fields of the E-C-SID is acquired and combined, and an operation defined by combined content is performed.

At this step, if the current compression segment identification to be processed in the segment list is determined to be the E-C-SID and the E-C-SID is the combined E-C-SID, the content of respective function fields of the combined E-C-SID is acquired and combined, and the operation defined by the combined content is determined and performed.

At step 33, content of a function field of the E-C-SID is acquired, and an operation defined by the content is performed.

At this step, if the current compression segment identification to be processed in the segment list is determined to be the E-C-SID and the E-C-SID is the single E-C-SID, the content of the function field of the single E-C-SID is acquired, and the operation defined by the content is performed.

The segment routing header compression method and the service processing method provided in the embodiments of the present disclosure may be applied in a uSID scene and a C-SID scene. In order to clearly describe the solution of the embodiments of the present disclosure, the solution of the embodiments of the present disclosure is described in detail in conjunction with the uSID scene and the C-SID scene, respectively.

Figure 6A:
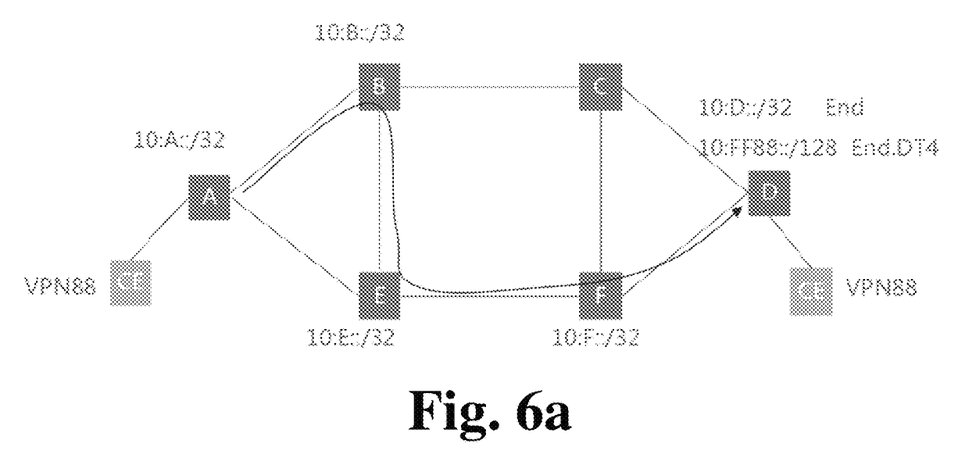
FIG. 6a is a network topology in a uSID scene provided according to an embodiment of the present disclosure.
Figure 6B:
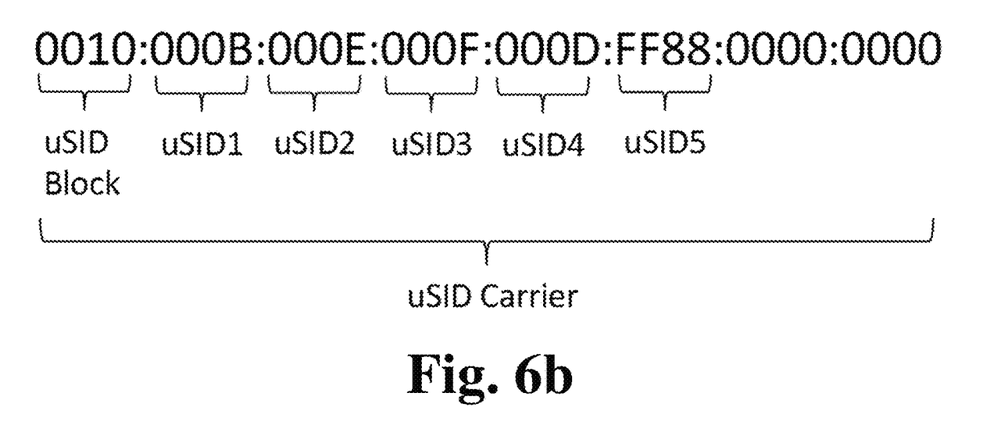

FIG. 6a is a network topology in the uSID scene provided according to an embodiment of the present disclosure. FIG. 6b is a schematic diagram of a DA in an IPv6 message header in FIG. 6a. In the uSID scene as shown in FIG. 6a and FIG. 6b, a uSID solution is adopted to perform segment routing header compression. In the uSID scene, 128 bits of a segment identification in an SRH are divided into one uSID block and multiple uSIDs. The uSID block is a common prefix, and each uSID represents one node or adjacency. The uSID block and the uSIDs each may be of 16 bits. When the service message passes through one node, a new DA may be formed by displacing the uSID to combine with the uSID block.

In the embodiment, a C-SID may be distinguished from an E-C-SID based on a value of a first flag field in a compression segment identification. Specifically, as shown in FIG. 3a, a length of the compression segment identification is 16 bits, and the C-SID differs from the E-C-SID only in the first bit (i.e., the first flag field). The value of the first bit being 0 indicates the C-SID, and the value of the first bit being 1 indicates the E-C-SID.

As shown in FIGS. 6a, A, B, C, D, E, and F are network nodes in an SR domain, and an A-B-E-F-D SRv6 tunnel (an arrow as shown in FIG. 6a) is created. The uSID block is set as 0010. The C-SIDs at nodes A/B/C/D/E/F are respectively configured as 000A/000B/000C/000D/000E/000F. After being diffused by an IGP protocol, these C-SIDs are respectively arranged in a global routing table of all nodes. The node D is further configured with an E-C-SID having a value of FF88, and the E-C-SID is arranged in a local segment identification table of the node D.

The node A generates an SRv6 tunnel, a uSID compression format is adopted, and a DA in an IPv6 header is: 10:B:E:F:D:FF88::. An end operation is defined in the E-C-SID of the node D, so as to realize network programming processing.

Service processing flow is as follows. After generating a segment list, the node A forwards a service message to a next-hop node B. The node B acquires the segment list from an SRH of the received service message, determines that there is an unprocessed compression segment identification in the segment list, acquires a next compression segment identification by performing a displacement, determines that the current compression segment identification to be processed is a C-SID (i.e., the C-SID of the node E), and forwards the service message to a next-hop node E according to an instruction of the C-SID. The node E acquires the segment list from the SRH of the received service message, determines that there is an unprocessed compression segment identification in the segment list, acquires a next compression segment identification by performing a displacement, determines that the current compression segment identification to be processed is a C-SID (i.e., the C-SID of the node F), and forwards the service message to a next-hop node F according to an instruction of the C-SID. The node F acquires the segment list from the SRH of the received service message, determines that there is an unprocessed compression segment identification in the segment list, acquires a next compression segment identification by performing a displacement, determines that the current compression segment identification to be processed is a C-SID (i.e., the C-SID of the node D), performs an operation according to the instruction of the C-SID, determines that there is an unprocessed compression segment identification in the segment list, acquires a next compression segment identification by performing a displacement, determines that the current compression segment identification to be processed is an E-C-SID (i.e., the E-C-SID of the node D), acquires content of a function field of the E-C-SID of the node D, and performs a corresponding operation. At this time, there is no unprocessed SID in the segment list, and the service processing flow ends.

In the embodiment, a segment list that originally requires 4*128 bits may be compressed in a 128-bit DA, which realizes compression of a segment routing header of the SRv6 and meanwhile provides a network programming capability. It should be noted that, in the embodiment, although the network programming capability is only embodied at a tail node (the node D) of the SRv6 tunnel, the network programming capability may also be realized at an intermediate node of the tunnel.

Figure 7A:
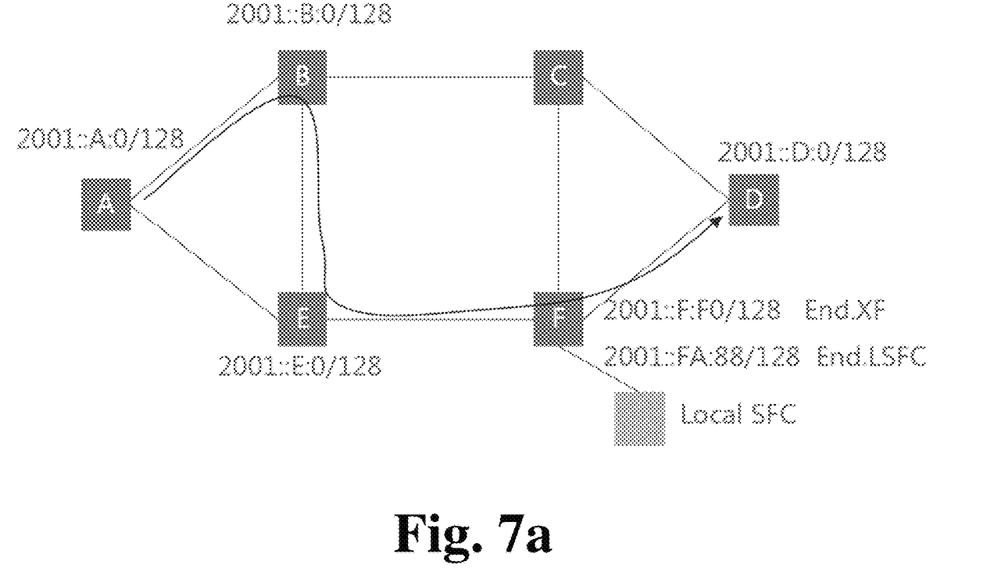
FIG. 7a is a network topology in a C-SID scene provided according to an embodiment of the present disclosure.
Figure 7B:
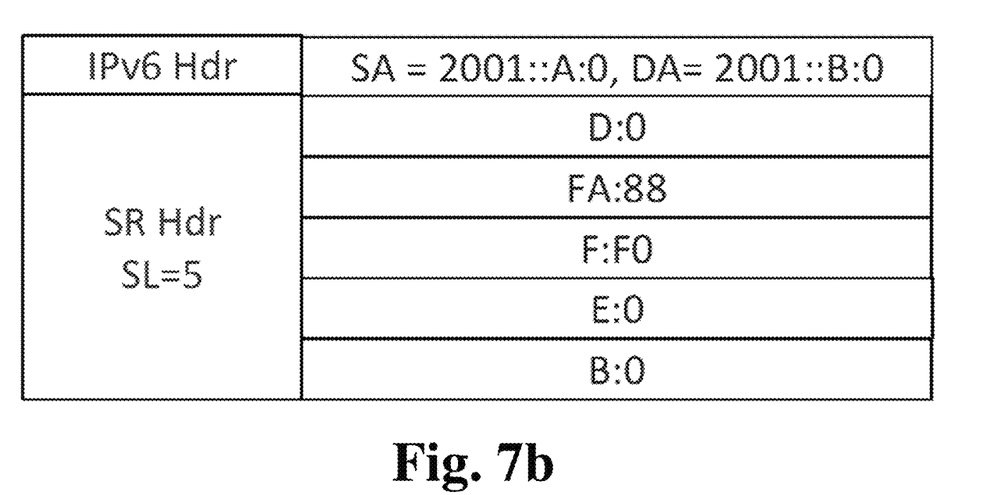

FIG. 7a is a network topology in a C-SID scene provided according to an embodiment of the present disclosure. FIG. 7b is a schematic diagram showing adopting an SRH of a single E-C-SID in FIG. 7a. In the C-SID scene as shown in FIG. 7a and FIG. 7b, a C-SID solution is used to perform segment routing header compression. In the C-SID scene, a compression segment identification is divided into a portion of a common prefix and a portion of a node/adjacency identification. However, the common prefix of the compression segment identification is only embodied in a DA of an IPv6, and the SRH only carries a compressed portion of the node/adjacency identification. Each time when a service message passes through a node, a corresponding compression header (C-SID) in the SRH is taken to replace a corresponding bit in the DA. In order to achieve the programming capability, a 128-bit compression segment identification is placed at a tail of the C-SID.

In the embodiment, a function field is set in a C-SID of a node which has been configured with an E-C-SID, and the function field is used to define the process of the E-C-SID of the node to which the C-SID belongs. Specifically, as shown in FIG. 3b, a 32-bit compression segment identification length is adopted. For the C-SID, first 16 bits are defined as a locator field, and final 16 bits are defined as a function field. A division of 16 bits 16 bits is adopted for easy description herein. In actual application, the locator field generally occupies more bits. For example, a division of 20 bits|20 bits is adopted. For the E-C-SID, first 16 bits are defined as a function field, and final 16 bits are defined as an argument field. The division is also for easy description herein, and a flexible division may be adopted as required in actual application.

As shown in FIGS. 7a, A, B, C, D, E, and F are network nodes in an SR domain, and an A-B-E-F-D SRv6 tunnel (an arrow as shown in FIG. 7a) is created. A common prefix of the SR domain is set as 2001. The C-SIDs at nodes A/B/C/D/E/F are respectively configured as A:0/B:0/C:0/D:0/E:0/F:0. After being diffused by an IGP protocol, these C-SIDs are respectively arranged in a global routing table of all nodes. A new end operation is defined in the C-SID of the node F, i.e., End.XF, which indicates that the E-C-SID needs to be processed. Besides, an E-C-SID (a single E-C-SID) having a value of FA:88 is configured at the node F, and the E-C-SID is arranged in a local segment identification table of the node F to realize a local service chain function.

The node A generates an SRv6 tunnel, a C-SID compression format is adopted, and an SRH of the C-SID is as shown in FIG. 7b. The end operation defined by the original C-SID compression solution remains the same. Generally, a current C-SID pointed by an SL (segments left) pointer is used to replace final 32 bits in the DA. If a final C-SID has 128 bits, the entire DA is replaced directly.

The service processing flow is as follows. After generating a segment list, the node A forwards a service message to a next-hop node B. The node B acquires the segment list from an SRH of the received service message, determines that there is an unprocessed compression segment identification in the segment list, acquires a next compression segment identification by subtracting 1 from the SL, determines that the current compression segment identification to be processed is a C-SID (i.e., the C-SID of the node E), and forwards the service message to a next-hop node E according to an instruction of the C-SID. The node E acquires the segment list from the SRH of the received service message, determines that there is an unprocessed compression segment identification in the segment list, acquires a next compression segment identification by subtracting 1 from the SL, determines that the current compression segment identification to be processed is a C-SID (i.e., the C-SID of the node F), and forwards the service message to a next-hop node F according to an instruction of the C-SID. The node F acquires the segment list from the SRH of the received service message, determines that there is an unprocessed compression segment identification in the segment list, acquires a next compression segment identification by subtracting 1 from the SL, determines that the current compression segment identification to be processed is an E-C-SID (i.e., the E-C-SID of the node F), acquires content of a function field of the E-C-SID, and performs an operation defined by the content. The node F determines that there is an unprocessed compression segment identification in the segment list, acquires a next compression segment identification by subtracting 1 from the SL, determines that the current compression segment identification to be processed is a C-SID (i.e., the C-SID of the node D), and forwards the service message to a next-hop node D according to an instruction of the C-SID. The node D acquires the segment list from the SRH of the received service message, determines that there is no unprocessed compression segment identification in the segment list. The flow ends.

In the embodiment, a segment list that originally requires 4*128 bits may be compressed to be a segment list that requires 5*32 bits, which realizes compression of a segment routing header of the SRv6 and meanwhile provides a network programming capability.

In the C-SID scene shown in FIG. 7a and FIG. 7b, the combined E-C-SID may be adopted to realize programing, so as to realize a more complex encoding function. A format of the combined E-C-SID may be as shown in FIG. 3c. The combined E-C-SID may include two 32 bits. First 4 bits represent a first length field, and are used for indicating a length of the combined E-C-SID, i.e., a multiple of 32 bits; and final 16 bits represent an argument field, and the remaining intermediate bits represent a function field.

Figure 7C:
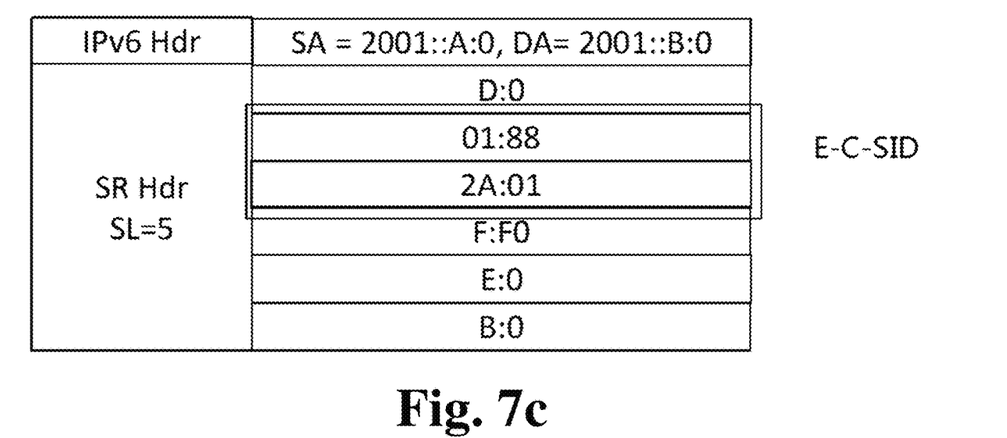

In the embodiment, the node A generates an SRv6 tunnel, a C-SID compression format is adopted, and an SRC of the C-SID is as shown in FIG. 7c. FIG. 7c is schematic diagram showing adopting an SRH of the combined E-C-SID in FIG. 7a. Service processing flows of the node A, B, E, and D are all the same as the service processing flow of the single E-C-SID in the previous embodiment, except that a difference only lies in that the F node acquires content of two function fields (i.e., 28 bits and 16 bits) of the E-C-SID of the node F respectively, combines the content, and performs an operation defined by combined content.

Figure 8:
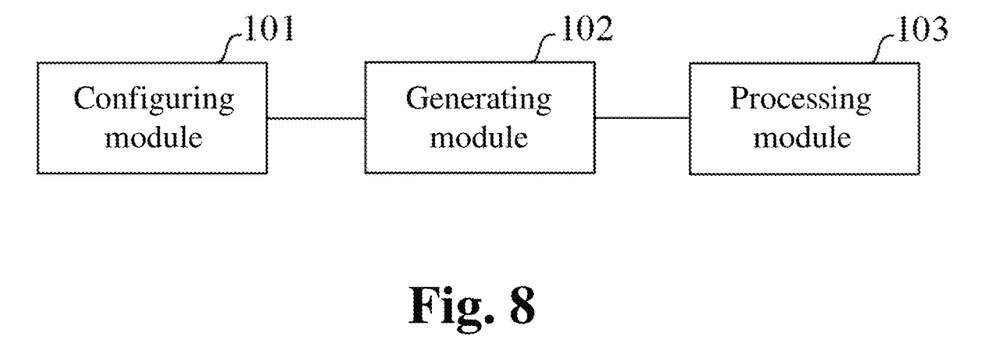
FIG. 8 is a schematic diagram of a structure of a segment routing header compression apparatus provided according to an embodiment of the present disclosure.

Based on the same technical concept, an embodiment of the present disclosure further provides a segment routing header compression apparatus. As shown in FIG. 8, FIG. 8 is a schematic diagram of a structure of a segment routing header compression apparatus provided according to the embodiment of the present disclosure. The segment routing header compression apparatus may include a configuring module 101, a generating module 102, and a processing module 103.

The configuring module 101 may be configured to configure a C-SID for each node on a segment routing path, and to configure an E-C-SID additionally for at least some of nodes on the segment routing path, the E-C-SID including at least a function field.

The generating module 102 may be configured to generate a segment list which includes the C-SID and the E-C-SID; and in the segment list, the E-C-SID is adjacent to and located after the C-SID of a node to which the E-C-SID belongs.

The processing module 103 may be configured to carry the segment list in an SRH of a service message.

In some embodiments, the E-C-SID may further include an argument field.

In some embodiments, the E-C-SID may be a single E-C-SID or a combined E-C-SID. The single E-C-SID includes one function field. The combined E-C-SID includes multiple function fields, and respective function fields are respectively used to realize different portions of the same function.

In some embodiments, the C-SID and the E-C-SID may include a first flag field for indicating the C-SID or the E-C-SID.

In some embodiments, an SRH of a service message may include a second flag field for indicating that respective compression segment identification in the segment list is the C-SID or the E-C-SID.

In some embodiments, the C-SID of a node that has configured with the E-C-SID may include a function field, and the function field of the C-SID is used to define the process for the E-C-SID of the node to which the C-SID belongs.

In some embodiments, the C-SID may include a first length field for indicating a length of the E-C-SID of the node to which the C-SID belongs, and the length is a multiple of a length of the single E-C-SID.

In some embodiments, the E-C-SID may include a second length field for indicating a length of the E-C-SID, and the length is a multiple of the length of the single E-C-SID.

In some embodiments, the E-C-SID may include a third flag field for indicating whether the E-C-SID is a final E-C-SID of the node to which the E-C-SID belongs.

Figure 9:
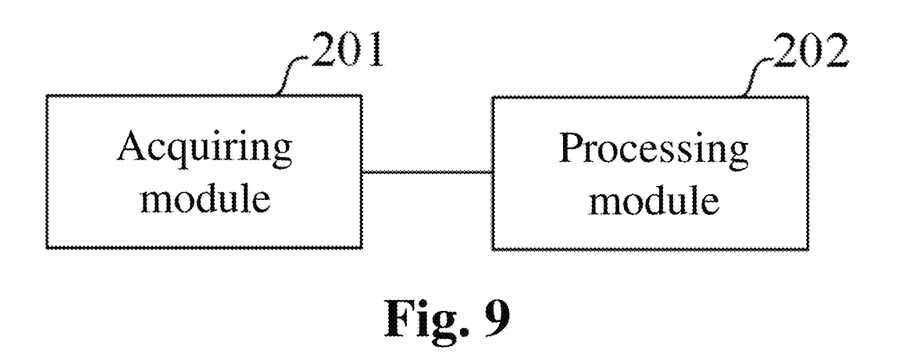
FIG. 9 is a schematic diagram of a structure of a service processing apparatus provided according to an embodiment of the present disclosure.

Based on the same technical concept, an embodiment of the present disclosure further provides a service processing apparatus, which is applied to a node on a segment routing path. Each node on the segment routing path is configured with a C-SID, and at least some of nodes on the segment routing path are additionally configured with an E-C-SID, the E-C-SID at least including a function field. As shown in FIG. 9, FIG. 9 is a schematic diagram of a structure of a service processing apparatus provided according to the embodiment of the present disclosure. The service processing apparatus may include an acquiring module 201 and a processing module 202.

The acquiring module 201 may be configured to acquire a segment list from an SRH of a received service message. The segment list includes a C-SID and an E-C-SID, and the E-C-SID is adjacent to and located after the C-SID of a node to which the E-C-SID belongs.

The processing module 202 may be configured to acquire content of a function field of the E-C-SID and to perform an operation defined by the content if a current compression segment identification to be processed is the E-C-SID.

In some embodiments, the processing module 202 may be configured to determine that the current compression segment identification to be processed in the segment list is the E-C-SID if one of the following conditions is met: a value of a preset first flag field in the current compression segment identification to be processed being a flag for indicating the E-C-SID; a value of a preset second flag field in an SRH of a service message being a flag for indicating that the current compression segment identification to be processed is the E-C-SID; and a function field of a previous processed C-SID in the segment list having defined the process for the E-C-SID of the node to which the C-SID belongs.

In some embodiments, the E-C-SID may be a single E-C-SID. The single E-C-SID includes one function field. The processing module 202 may be configured to acquire content of the function field of the single E-C-SID and to perform an operation defined by the content if the E-C-SID is the single E-C-SID.

In some embodiments, the E-C-SID may be a combined E-C-SID. The combined E-C-SID includes multiple function fields, and respective function fields are respectively used to realize different portions of the same function. The processing module 202 may be configured to acquire and combine content of respective function fields of the combined E-C-SID and to perform an operation defined by combined content if the E-C-SID is the combined E-C-SID.

In some embodiments, the processing module 202 may be configured to determine that the E-C-SID is the combined E-C-SID if one of the following conditions is met: a value of a preset first length field in the C-SID of a node to which the E-C-SID belongs being greater than or equal to 2, the first length field being used for indicating a length of the E-C-SID of the node to which the C-SID belongs, the length being a multiple of a length of the single E-C-SID; a value of a preset second length field in the E-C-SID being greater than or equal to 2, the second length field being used for indicating a length of the E-C-SID, the length being a multiple of the length of the single E-C-SID; and a value of a preset third flag field in the E-C-SID indicating that the E-C-SID is not a final E-C-SID of the node to which the E-C-SID belongs.

An embodiment of the present disclosure further discloses a computer device. The computer device includes one or more processors and a storage apparatus. The storage apparatus stores one or more programs which, when executed by the above one or more processors, cause the above one or more processors to implement the segment routing header compression method provided according to any of the above embodiments.

An embodiment of the present disclosure further discloses a computer device. The computer device includes one or more processors and a storage apparatus. The storage apparatus stores one or more programs which, when executed by the above one or more processors, cause the above one or more processors to implement the service processing method provided according to any of the above embodiments.

An embodiment of the present disclosure further discloses a computer readable medium, which stores a computer program. When the computer program is executed, the segment routing header compression method provided according to any of the above embodiments is implemented.

An embodiment of the present disclosure further discloses a computer readable medium, which stores a computer program. When the computer program is executed, the service processing method provided according to any of the above embodiments is implemented.

A person of ordinary skills in the art may understand that, all or some steps of the method disclosed above and functional modules/units of a device may be implemented as software, firmware, hardware, and a proper combination thereof. In an embodiment of the hardware, a division of the functional modules/units mentioned in the above description does not necessarily correspond to a division of physical components. For example, one physical component may have multiple functions, or one function or step may be implemented by multiple physical components cooperatively. Some physical components or all physical components may be implemented as software executed by a processor, such as a central processor, a digital signal processor or a microprocessor, or may be implemented as hardware, or may be implemented as an integrated circuit, such as an application-specific integrated circuit. Such software may be distributed on a computer readable medium, and the computer readable medium may include a computer storage medium (or non-transient medium) and a communication medium (or transient medium). As is known to a person of ordinary skills in the art, the term, computer storage medium, includes volatile and non-volatile, removable and non-removable mediums that may be implemented in any method or technology for storing information (such as a computer readable instruction, a data structure, and a program module or other data). The computer storage medium includes, but is not limited to, an RAM, an ROM, an EEPROM, a flash memory or other memory technology, a CD-ROM, a digital video disk (DVD) or other optical disk storage, a magnetic cassette, a magnetic tape, a magnetic disk storage or other magnetic storage device, or any other medium which can be used to store the desired information and can be accessed by a computer. Besides, it is known to a person of ordinary skills in the art that, the communication medium generally includes a computer readable instruction, a data structure, a program module or other data in a modulated data signal such as a carrier wave or other transport mechanism and can include any information delivery medium.

Exemplary embodiments have been disclosed herein. Although specific terms are adopted, they are only used and shall only be interpreted as having general descriptive meanings, and they are not used for a limiting purpose. In some embodiments, it is obvious for those skilled in the art that, unless otherwise expressly indicated, features, characteristics, and/or elements described in combination with a specific embodiment may be used separately, or may be used in combination with features, characteristics, and/or elements described in conjunction with other embodiments. Therefore, it will be understood by those skilled in the art that various changes in forms and details may be made without departing from the scope of the present disclosure set forth in the appended claims.

The invention claimed is:

1. A segment routing header compression method, comprising:
configuring a regular compression segment identification for respective nodes on a segment routing path and configuring an extended compression segment identification for at least one of nodes on the segment routing path, the extended compression segment identification of the at least one of the nodes comprising at least a function field;
generating a segment list, the segment list comprising the regular compression segment identification of the respective nodes and the extended compression segment identification of the at least one of the nodes, wherein in the segment list, the extended compression segment identification of the at least one of the nodes is adjacent to and located behind the regular compression segment identification of the at least one of the nodes; and
carrying the segment list in a segment routing header of a service message.

2. The method according to claim 1, wherein the extended compression segment identification of the at least one of the nodes further comprises an argument field.

3. The method according to claim 2, wherein
the extended compression segment identification of the at least one of the nodes is a single extended compression segment identification or a combined extended compression segment identification, and
the single extended compression segment identification comprises one function field; and the combined extended compression segment identification comprises multiple function fields, and the multiple function fields are used to realize different portions of a same function.

4. The method according to claim 1, wherein
the extended compression segment identification of the at least one of the nodes is a single extended compression segment identification or a combined extended compression segment identification, and
the single extended compression segment identification comprises one function field; and the combined extended compression segment identification comprises multiple function fields, and the multiple function fields are used to realize different portions of a same function.

5. The method according to claim 1, wherein
any compression segment identification of the regular compression segment identification and the extended compression segment identification comprises: a first flag field, and the first flag field is used for indicating whether the any compression segment identification is the regular compression segment identification or the extended compression segment identification; or
the segment routing header of the service message comprises: a second flag field, and the second flag field is used for indicating whether the any compression segment identification in the segment list is the regular compression segment identification or the extended compression segment identification; or
the regular compression segment identification of the at least one of the nodes comprises a function field for defining the process for the extended compression segment identification of the at least one of the nodes.

6. The method according to claim 1, wherein
the regular compression segment identification of the at least one of the nodes comprises: a first length field, and the first length field is used for indicating a first length of the extended compression segment identification of the at least one of the nodes, and the first length is a multiple of a length of a single extended compression segment identification; or
the extended compression segment identification of the at least one of the nodes comprises: a second length field, and the second length field is used for indicating a second length of the extended compression segment identification of the at least one of the nodes, and the second length is a multiple of the length of the single extended compression segment identification; or
the extended compression segment identification of the at least one of the nodes comprises: a third flag field, and the third flag field is used for indicating whether the extended compression segment identification of the at least one of the nodes is a final extended compression segment identification of the at least one of the nodes.

7. A computer device, comprising:
one or more processors; and
a storage apparatus storing one or more programs thereon, wherein the one or more programs, when executed by the one or more processors, causes the one or more processors to implement the segment routing header compression method according to claim 1.

8. A non-transitory computer readable medium, which stores a computer program, wherein the program, when executed, implements the segment routing header compression method according to claim 1.

9. A service processing method, applied to a node on a segment routing path, comprising:
acquiring a segment list from a segment routing header of a received service message, wherein the segment list comprises a regular compression segment identification configured for respective nodes on the segment routing path and an extended compression segment identification configured for at least one of nodes on the segment routing path, and the extended compression segment identification configured for the at least one of the nodes is adjacent to and located behind the regular compression segment identification configured for the at least one of the nodes; and
acquiring, in response to determining that a current compression segment identification to be processed in the segment list is the extended compression segment identification, content of a function field of the extended compression segment identification, and performing an operation defined by the content.

10. The method according to claim 9, wherein determining that the current compression segment identification to be processed is the extended compression segment identification comprises: determining that the current compression segment identification to be processed is the extended compression segment identification in response to determining that one of the following conditions is met:
a value of a preset first flag field in the current compression segment identification to be processed being a flag for indicating the extended compression segment identification;
a value of a preset second flag field in a segment routing header of the service message being a flag for indicating that the current compression segment identification to be processed is the extended compression segment identification; and
a function field of a processed regular compression segment identification in the segment list defining the process for the extended compression segment identification of a node to which the processed regular compression segment identification belongs, wherein in the segment list, the processed regular compression segment identification is adjacent to and before the current compression segment identification to be processed.

11. The method according to claim 9, wherein
the extended compression segment identification comprises a single extended compression segment identification, and the single extended compression segment identification comprises one function field; and
acquiring the content of the function field of the extended compression segment identification and performing the operation defined by the content comprise:
acquiring, in response to determining that the extended compression segment identification is the single extended compression segment identification, content of the one function field of the single extended compression segment identification, and performing an operation defined by the content of the one function field.

12. The method according to claim 9, wherein
the extended compression segment identification comprises a combined extended compression segment identification, and the combined extended compression segment identification comprises multiple function fields, the multiple function fields being used for realizing different portions of a same function; and
acquiring the content of the function field of the extended compression segment identification and performing the operation defined by the content comprise:
acquiring, in response to determining that the extended compression segment identification is the combined extended compression segment identification, content of the multiple function fields of the combined extended compression segment identification, combining the content of the multiple function fields, and performing an operation defined by combined content.

13. The method according to claim 12, further comprising: determining that the extended compression segment identification is the combined extended compression segment identification in response to determining that one of the following conditions is met:
a value of a preset first length field in the regular compression segment identification of a node to which the extended compression segment identification belongs being greater than or equal to 2, wherein the first length field is used for indicating a first length of the extended compression segment identification, and the first length is a multiple of a length of a single extended compression segment identification;
a value of a preset second length field in the extended compression segment identification being greater than or equal to 2, wherein the second length field is used for indicating a second length of the extended compression segment identification, and the second length is a multiple of the length of the single extended compression segment identification; and
a value of a preset third flag field in the extended compression segment identification indicating that the extended compression segment identification is not a final extended compression segment identification of the node to which the extended compression segment identification belongs.

14. A computer device, comprising:
one or more processors; and
a storage apparatus storing one or more programs thereon, wherein the one or more programs, when executed by the one or more processors, causes the one or more processors to implement the segment routing header compression method according to claim 9.

15. A non-transitory computer readable medium, which stores a computer program, wherein the program, when executed, implements the segment routing header compression method according to claim 9.

* * * * *